US008270498B2

(12) United States Patent
Filippini et al.

(10) Patent No.: US 8,270,498 B2
(45) Date of Patent: Sep. 18, 2012

(54) DYNAMIC DITHERING FOR VIDEO COMPRESSION

(75) Inventors: Gianluca Filippini, Los Gatos, CA (US); Hsi-Jung Wu, San Jose, CA (US); James Oliver Normile, Los Altos, CA (US); Xiaojin Shi, Santa Cruz, CA (US); Xiaosong Zhou, San Jose, CA (US); Ionut Hristodorescu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 12/463,859

(22) Filed: May 11, 2009

(65) Prior Publication Data

US 2010/0246689 A1    Sep. 30, 2010

Related U.S. Application Data

(60) Provisional application No. 61/163,658, filed on Mar. 26, 2009.

(51) Int. Cl.
*H04N 7/12* (2006.01)
*G06K 9/40* (2006.01)
(52) U.S. Cl. .................................. 375/240.27; 382/269
(58) Field of Classification Search .................... 375/240
See application file for complete search history.

(56) References Cited

U.S. PATENT DOCUMENTS

| 4,956,638 | A | 9/1990 | Larky et al. |
| 5,148,273 | A | 9/1992 | Lippel |
| 5,184,124 | A | 2/1993 | Molpus et al. |
| 5,506,699 | A | 4/1996 | Wong |
| 5,623,558 | A | 4/1997 | Billawala et al. |
| 7,068,852 | B2 | 6/2006 | Braica |
| 2003/0142878 | A1* | 7/2003 | Willis et al. ............ 382/269 |
| 2005/0276515 | A1* | 12/2005 | Shekter .................. 382/286 |
| 2007/0035772 | A1 | 2/2007 | Kakutani |
| 2008/0055652 | A1 | 3/2008 | Kim |

FOREIGN PATENT DOCUMENTS

KR    20050050856 A1    6/2005

(Continued)

OTHER PUBLICATIONS

Mitchell et al., MPEG Video Compression Standard—Table of Contents, Chapman and Hall, New York, 1996 (To Examiner: Chapters will be furnished upon request).

(Continued)

*Primary Examiner* — Sath V Perungavoor
*Assistant Examiner* — Xiaolan Xu
(74) *Attorney, Agent, or Firm* — Kenyon & Kenyon LLP

(57) ABSTRACT

A method and device for dithering video from a decoder. The method and device provide: selecting a segment of video frames from the video; computing a noise map for the segment of the video, the noise map computed from differences among pixels selected from spatially-distributed sampling patterns in the segment; determining contours of quantization artifacts within the video frame based on the noise map and a histogram of pixel values in the video frame; computing a gradient measurement of pixel values along the contours; identifying regions along the contours of quantization artifacts to apply dithering based on the noise map and the gradient measurement; determining a dithering strength based on the noise map and the gradient measurement; and applying dithering noise to the identified regions at the determined dithering strength.

33 Claims, 12 Drawing Sheets

FOREIGN PATENT DOCUMENTS

WO 2009005497 A1 1/2009

OTHER PUBLICATIONS

ITU-T Recommendation H.263, Video Coding for Low Bit Rate Communication (Jan. 2005).

ITU-T Recommendation H.264, Advanced Video Coding (Mar. 2010).

Conklin, "Dithering 5 Tap Filter for Inloop Deblocking," JVT MPEG Meeting, May 6-10, 2002; Fairfax, VA, US; Joint Video Team of ISO/IEC JTC1/SC29/WG11 and ITU-T SG.16, No. JVT-C056, May 10, 2002.

Chono et al., "Video Coding Technology Proposal by NEC," Joint Collaborative Team on Video Coding of ISO/IEC JTC1/SC29/WG11 and ITU-T SG. 16 (URL:http://WFTP3.ITU.INT/AV-ARCH/JCTVC-site/), No. JCTVC-A104, Apr. 18, 2010.

\* cited by examiner

DYNAMIC DITHERING FOR VIDEO COMPRESSION

CROSS-REFERENCE TO RELATED APPLICATIONS

This application claims priority to U.S. Provisional Patent Application No. 61/163,658, filed Mar. 26, 2009, entitled "Dynamic Dithering For Video Compression," which is herein incorporated by reference in its entirety.

FIELD OF THE INVENTION

The present invention is generally directed to video processing techniques and devices. In particular, the present invention is directed to dithering for reducing banding or quantization artifacts in video images.

BACKGROUND INFORMATION

Quantization is widely used in video coding or video compression. Quantization is a non-linear process that allows reducing the amount of bits needed for encoding a specific information. In general, quantization is a lossy process. Many methods exist for reducing quantization errors in a quantized signal.

For video compression, quantization errors may have many adverse effects on the perception of the underlying video. Some of the effects may be immediately visible to a user, while others may not be immediately visible but still important to the perceived quality of the video.

For block-based video compression (those used in video compression standards, such as MPEG-2, MPEG-4, H.264, or H.262), the most visible quantization effects may be banding and block artifacts, especially at low bitrate video compression. The block artifacts may be directly caused by block-based video compression schemes where pixel blocks are used to encode video. If the quantization is too strong (e.g., when the very low bitrates force the encoder to compress the video too deep), only a uniform color-flat block may be locally visible and thus lose all the details from the input picture frame.

Banding artifacts may be similar to block artifacts, but banding may be visible at all bitrates—including even high bitrates. Banding may be specially visible in areas having smooth gradient in color, e.g., a clear sky in a movie, or landscapes in a computer-generated movie graphics, e.g., in a cartoon movie.

Quantization errors may be introduced at a number of points during a video encoding process. Referring to FIG. 1, a source video may include a plurality of picture frames 102 digitally recorded or digitized from analog source of a non-compressed format having high precision and high bits per channel, e.g., 10 or 12 bits per channel (luma or chroma) with a high density chroma sampling factor, e.g., 4:4:4 in a Society of Motion Picture and Engineers (or SMPTE) specification. These high-quality video formats may preserve very fine details of the source video or picture frames as digital or digitized analog contents.

For consumer-quality video encoding and for implementation purpose, such as limitations on speed and storage, a majority of encoders may use a compression format with fewer number of bits per channel and/or a less wide chroma sub-sampling 106, e.g., 8 bits per channel with a 4:2:2 sampling factor or 8 bits per channel with a 4:2:0 sampling factor. The sub-sampled chroma format may be a compromise between quality and data rate.

The reduced number of bits may introduce quantization errors 104 directly on the non-compressed source, at the input of the encoding chain. Under certain situations, the provider of the source video may take appropriate measures to cover quantization and/or banding artifacts on the source video or picture frames. However, in other situations, the provider may not.

When only the low bits per channel version of a video is available rather than the high quality source video, a processor may perform a "blind" search for possible locations of banding or blocking artifacts. In encoding phase, the video encoder 108 may need to match the final coding bit rate to maximize video quality. The matching may be achieved by using rate control 110 at the encoder to drive the quantization 112 of the encoder. The encoded video may be transmitted over a communication channel or stored on a storage medium, e.g., a DVD, as encoded bitstreams for a decoder. Since low quality encoding may produce severe blocking artifacts, loop de-blocking filters may be used, e.g., in a H.264 decoder 116, to reduce these artifacts in the output picture frames 120.

The banding artifacts, even in high quality encoding schemes, may still be clearly visible to a user. This is especially true in coding movie scenes of large areas with uniform slow slope gradients of color, e.g., blue sky or fading in movie titles. This banding effect may be due to limitations in the block-based coding models in existing standards such as MPEG-2 or H.264. Having a color gradient whose slope is finer than the minimum quantization step allowed may most likely to cause visible artifacts on the final picture frames.

Dithering technique may be used to mask the banding artifacts that may be caused by quantization. "Dithering" is commonly understood as an intentional application of noise to video or audio, used to randomize quantization errors, to prevent large-scale patterns. Further, dithering is commonly applied globally to all pixels within a video frame before quantization or re-quantization process in order to prevent non-linear distortion. Additionally, the amount of noise added in dithering may depend on many factors. For example, the lesser the bit depth at each pixel, the greater the dither may need to be. A global dithering, e.g., adding the same amount of noise to each pixel based on a global measurement of quantization errors in a video frame may add noise not only to parts with banding artifacts, but also to parts that may not need to be dithered or may need to be dithered with different amounts of noise.

Therefore, there is a need for a dynamic blind analysis method and system that estimate the locations and amount of dithering for adaptively reducing banding effects caused by quantization.

DETAILED DESCRIPTION OF EXAMPLE EMBODIMENTS

Embodiments of the present invention may provide a method and device for dithering video from a decoder. The method and device provide: selecting a segment of video frames from the video; computing a noise map for the segment of the video, the noise map computed from differences among pixels selected from spatially-distributed sampling patterns in the segment; determining contours of quantization artifacts within the video frame based on the noise map and a histogram of pixel values in the video frame; computing a gradient measurement of pixel values along the contours; identifying regions along the contours of quantization artifacts to apply dithering based on the noise map and the gradient measurement; determining a dithering strength based on the noise map and the gradient measurement; and applying dithering noise to the identified regions at the determined dithering strength.

Embodiments of the present invention may provide a method and device for dithering video from a decoder based on a bitstream and dithering information transmitted from a custom encoder over a communication channel. The method and device may provide (a) selecting a segment of video frames from the video; (b) computing a noise map for the segment of the video, the noise map computed from differences among pixels selected from spatially-distributed sampling patterns in the segment; (c) determining contours of quantization artifacts within the video frame based on the noise map and a histogram of pixel values in the video frame; (d) computing a gradient measurement of pixel values along the contours; and (e) transmitting the bitstream and dithering information over the communication channel to a decoder, wherein the dithering information includes the contours of quantization artifacts, an amount of dithering noise and dithering regions along the contours, the amount of noise and the dithering regions determined based on the noise map and the gradient measurement.

Figure 1:
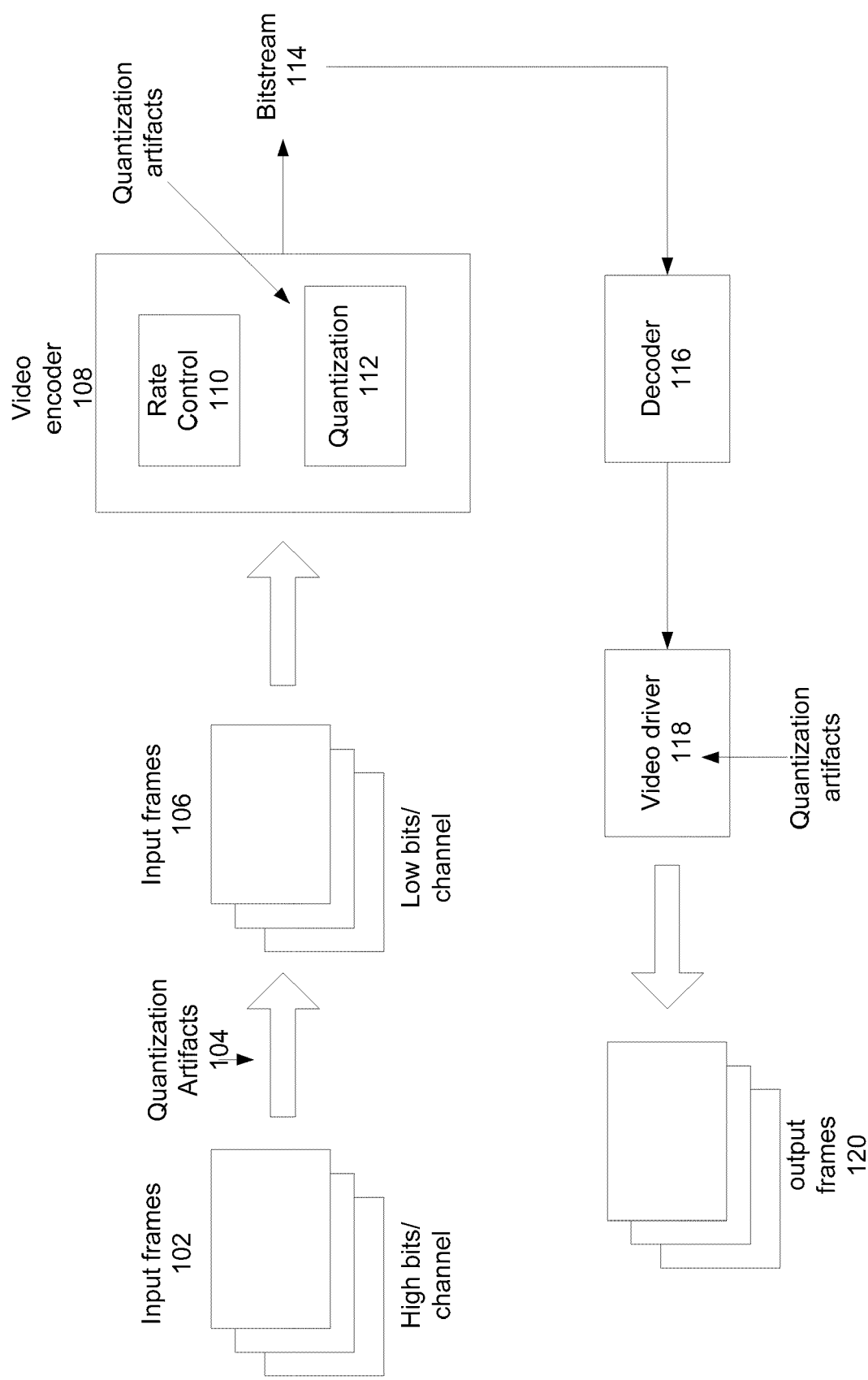
FIG. 1 is a conventional video encoding and decoding transmission process that shows different types of quantization errors may be introduced.
Figure 2:
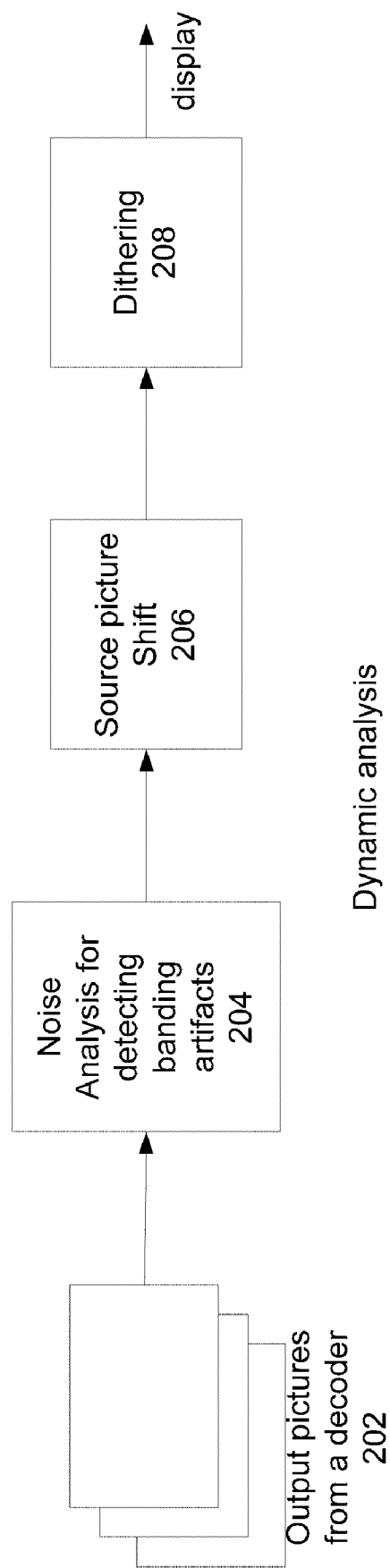
FIG. 2 shows a three-stage dithering process for reducing banding artifacts according to one example embodiment of the present invention.

Embodiments of the present invention may provide a post-processor capable of blind analysis of quantization artifacts, in particular banding artifacts, that may exist in video streams decoded from a standard video decoder, e.g., a MPEG-2 or H.264 decoder. FIG. 2 shows such a scenario. A coded bitstream from a transmission channel, e.g., an IP network or cable network, or from a storage device (e.g., a portable video player), may be decoded via a decoder to generate an output video which may include a stack of picture frames 202 for display. However, before being displayed, some of the picture frames may be further processed with dynamic dithering for improved perceptual quality.

In an example embodiment, a post-processor 200 may include three processing stages that includes (1) a noise analysis module 204 for detecting regions of quantization artifacts, e.g., contours of banding artifacts, in a video frame, (2) a directional shift module 206 for estimating the amount of dither noise to be added to the detected region, and (3) a dithering module 208 (called "Analysis, directional Shift, and Dithering"). Together, the three stage dithering is hereinafter referred to as dynamic dithering.

In a conventional video coding and decoding (codec) situation, the decoder does not provide any extra noise information other than picture frames in the form of, e.g., pixels in a YUV space, and associated control information for display. Post-processing may detect areas of banding artifacts directly from the picture frames themselves.

For the three-stage post-processor, the WSAD analysis module 204 and directional shifting module 206 may together determine where and how much dithering may be applied to each picture frame. Accordingly, dithering 208 may be applied in a non-uniform way such that it may be applied only in certain areas in luma and chroma planes and with different strength amount that depends on the intensity of the artifacts to be masked.

The detection of banding artifact contours may be accomplished in different ways. In essence, the contour detection looks for slow-changing areas or flat areas, and the extent of the flat areas. In one example embodiment, the conventional band-pass filters, e.g., a difference-of-gaussians filter, may be applied to the video frame for detecting the banding artifacts. In another example embodiment, a weighted sum of absolute differences (WSAD) analysis may be used for detecting the band artifacts in a video frame. The WSAD calculation may be carried out in ways substantially similar to those described in a U.S. patent application, entitled "Blind Noise Estimation for Video Compression" (hereinafter, "Blind Noise Estimation Application") by the same inventors, filed on the even date with the present application. The "Blind Noise Estimation Application" is herein incorporated by reference in its entirety.

Figure 3:
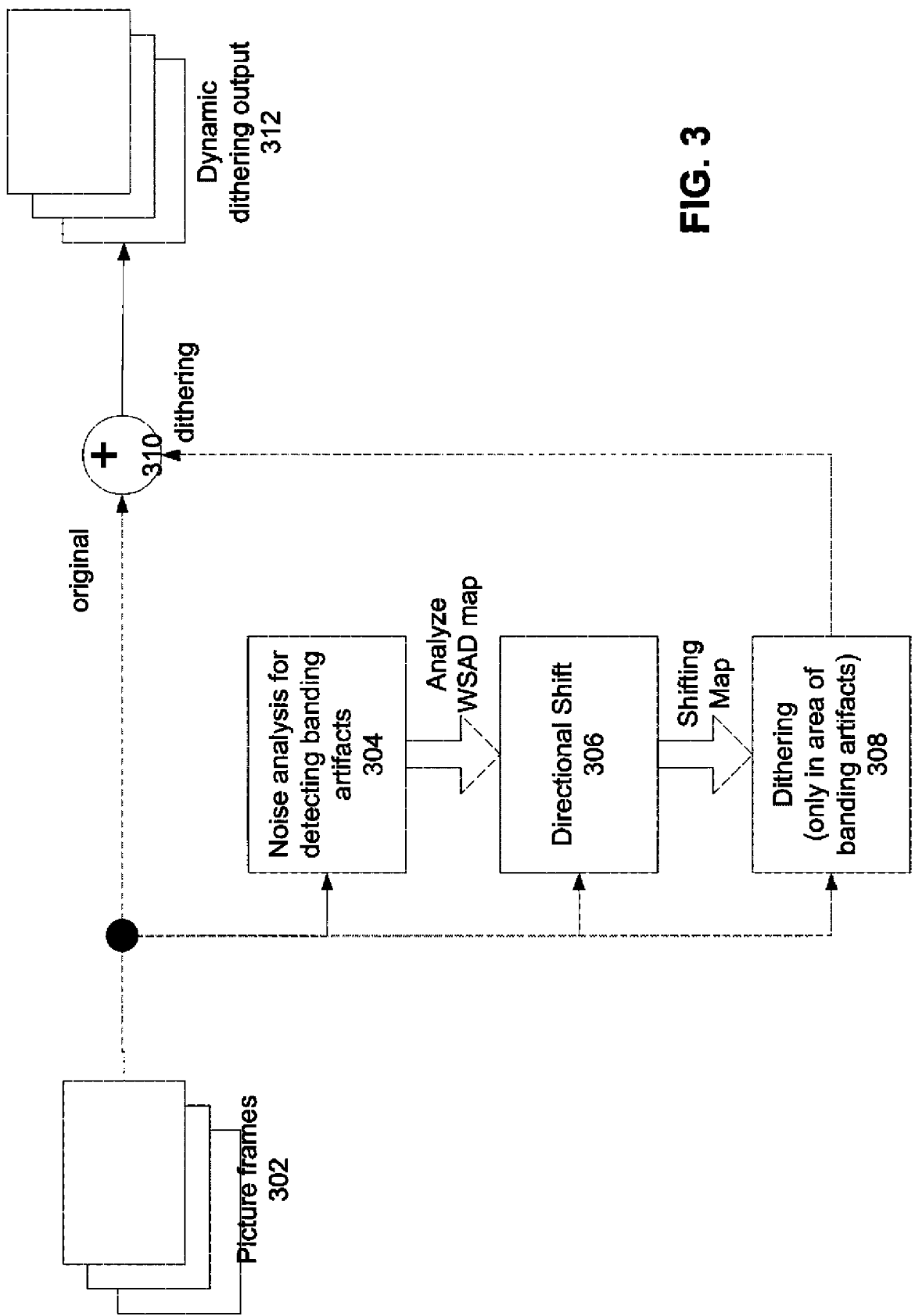
FIG. 3 shows a detailed schematic diagram of a three-stage dithering as a post-processor according to one example embodiment of the present invention.

FIG. 3 shows a schematic diagram of a three-stage dithering as a post-processor according to one example embodiment of the present invention. Picture frames 302 of a source video from a standard decoder may be fed directly into a noise analysis module 304, a directional shift module 306, and a dithering module 308. At 304, contours of banding artifact in a video frame may be detected based on the noise analysis, e.g., a WSAD based analysis where a WSAD value may be computed for each block of pixels as described in the "Blind Noise Estimation Application" to generate a WSAD map.

The WSAD analysis may be summarized as follow. To compute the WSAD map, the input picture may be divided into picture planes, each plane corresponding to a pixel component. For example, in an YUV color space, the three planes may correspond to one luma plane and two chroma planes. Alternatively, in an RGB color space, the three planes may correspond to red, green and blue colors. Each of the three planes may be further divided into blocks of pixels, e.g., blocks of 8×8 pixels.

A shift difference computation may be performed on the input picture. The input picture may be shifted both horizontally and vertically by a delta (Δ) amount of pixels. The shifted version of the picture may be subtracted from the original picture to compute the difference between the original and the shifted version. This shifted difference operation may isolate all the irregularities in the input picture including, e.g., noise and sharp edges, in the original picture. The irregularities may be structural or non-structural data in the original picture.

The amount of shift Δ may also depend on the grain of the noise to be detected and with the resolution (in pixels) of the input picture. In one example embodiment of the present invention, for a picture frame of a resolution of 1080 by 720 pixels, the Δ may be in the range of one to five pixels. The main factor for determining Δ may be the maximum spatial frequency of the noise which is to be determined. Thus, the shift Δ may be computed as a function of the maximum noise frequency, grain size and picture resolution.

The results of the shifted difference computation may include multiple blocks of e.g., 8×8 samples representing the shifted difference. For each pixel block, weighted sum of absolute differences (WSAD) may be computed. For each block, it is advantageous to compute at least two WSAD values based on, e.g., different sampling patterns. A greater number of WSAD values may increase the accuracy of the noise level measurements.

WSAD values may be computed based on the difference between the original image and the shifted image. The objective is to measure noise in a pixel block using multiple local gradient measures of pixel values. The gradients may simply be differences between pixels within the same block, which may be computed based on a pattern used to measure these differences.

The WSAD map may be an array of values, each of which may be a measure of noise in a pixel block. Pixel blocks may be adjacent to or overlapping each other so that the WSAD map may be an array with sizes up to the resolution of the picture frame. As discussed in the "Blind Noise Estimation Application," the WSAD computation may depend on sampling patterns, pixel shift, and most importantly, a weight function. The weight function may be a narrow V-shaped function for detecting minimal variations in the input signal. Additionally, the size of pixel blocks may also be important. In one embodiment, the pixel block size may include, e.g., 16 by 16 pixels (or 256 samples).

Alternatively, a band pass filter, e.g., a difference-of-gaussians filter, may be applied to frames of the video from a decoder. The results after band pass filtering may represent quantization artifacts including, e.g., the banding artifacts. In one example embodiment, the results may be a band-pass noise map, each point on which represents a noise measurement at a corresponding pixel. In another example embodiment, each point on the noise map may represent a noise measurement for a block of pixels, e.g., a 16×16 pixel block.

The resulting WSAD map and the band-pass noise map (together referred to as noise maps hereafter) may be further analyzed to determine where quantization artifacts, e.g., banding artifacts, may be present in a picture frame. Each point on the noise maps may represent a noise measurement either via band pass filtering or the WSAD analysis. In one example embodiment, the analysis may be based on statistics of the noise maps. The statistics may represent occurrence frequencies of different noise measurements within a range. The statistical analysis of the distribution of WSAD map values may detect these large and smooth areas. Further, based on the statistical analysis, areas in the noise maps with narrow and peak distributions may also be detected, e.g., by setting thresholds of distribution deviations in the statistics of the noise maps. The threshold values may be predetermined by a user. Further, a histogram of pixel values in the video frame may also be computed. The histogram may also be used to determine locations of quantization artifacts.

Based on the statistical analysis of the noise maps and histograms of pixel values, contours of banding artifacts may be determined. For example, the contours may be determined based on predetermined thresholds as regions corresponding to peaks in statistical analysis of noise measurements. In one example embodiment, the contours of banding artifacts may represent the regions where dither noise is added.

Figure 4:
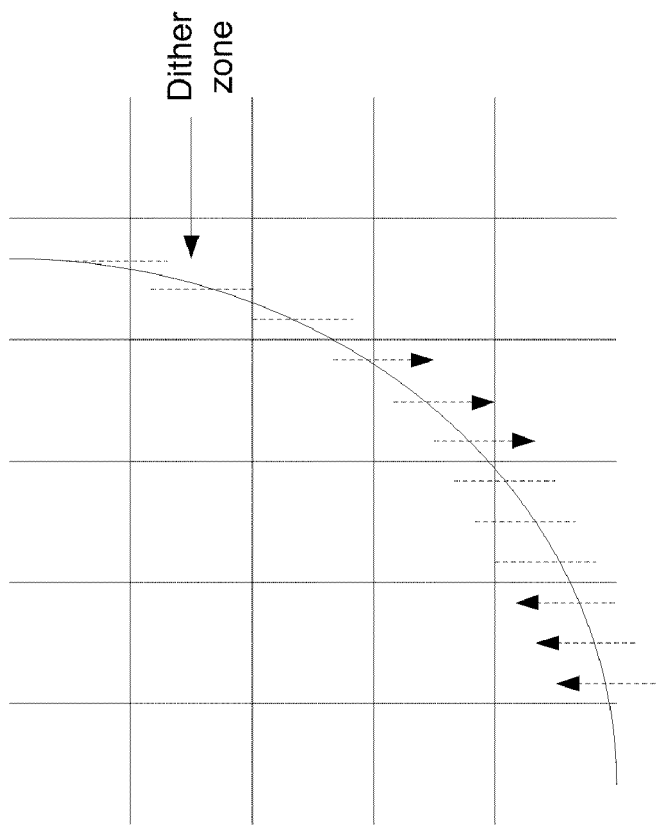
FIG. 4 shows (A) a band shifted in all direction and (B) a dithering zone base on the pixel shift according to one example embodiment of the present invention.
Figure 4:
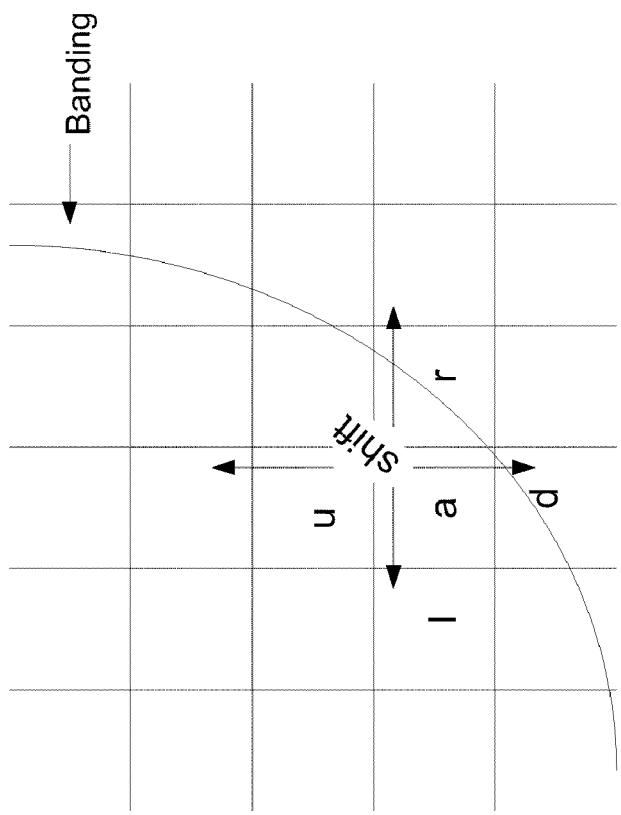

The noise maps may be further analyzed to determine the amount of noise to be added in regions of banding artifacts. In one example embodiment of the present invention, a shift and subtraction operation may be applied to the noise maps. The noise map may be divided into, e.g., blocks of 16×16 pixels. These blocks may be non-overlapping, e.g., adjacent with each other, or overlapping between blocks (not shown). Referring to FIG. 4A, a pixel block (a) may be shifted in a variety of predetermined directions, e.g., up (u), down (d), left (l), and right (r) to create a dithering zone as shown in FIG. (B) for an eventual application of dithering to the dithering zone. For example, the noise measurements with block (a) may be subtracted from noise measurements in blocks (u, d, l, r). The differences between blocks may represent changes of noise measurements. In one example embodiment, the differences between block (a) and the blocks (u, d, l, r) may be accumulatively recorded so that each point on the noise maps may have a shift and subtraction measurement. Depending on the selection of (u, d, l, r) blocks for the shift and subtraction computation, the shift and subtraction measurement may represent an isotropic or anisotropic gradients (i.e., directional gradients) on the noise map. The dithering zone may include information relating to directions to apply dithering and the amount or range of dithering, both of which may depend on gradients across banding artifacts. A dithering zone may be determined, e.g., based on thresholds applied to the gradient measurements.

An advantage of this technique is the ability to compute a detailed dithering zone from the picture frame itself without edge detections. The directional shift may generate a dithering zone along banding and/or quantization artifacts that may naturally follow artifact borders. In contrast, application of dithering in wrong areas may drastically reduce the visual quality and may further introduce new artifacts visible to a user.

In one example embodiment, the computation of the noise maps and directional gradients may require all channels (e.g., luma and chroma) of a picture frame since the statistical analysis may be computed as a correlation among the channels.

Various algorithms to generate dithering patterns are known. The principles of the present invention work cooperatively with conventional dithering techniques to apply them to regions determined by the noise analysis. However, both the directional gradient map and noise maps may be used to control the final dithering. Both the dithering pattern and dithering amplitude may be computed as a function of the amount of directional gradient and values on the noise maps.

Dithering pattern/amplitude=$f$(noise map values, directional gradients).

The added dithering noise may be locally correlated to the underlying scene. Moreover, the dithering may be based on the amplitude and dithering zone computed at the analysis stage. The overall effects may be a non-linear blurring at banding and/or quantization artifacts in post processing to mask these artifacts. The processing is non-linear since the final results are achieved without using linear filtering techniques in either the pixel or the frequency domain at the noise analysis or the directional shift stage. Additionally, since the dithering may effectively blur all artifacts from banding and/or quantization artifacts (including blocking effects), the dithering may effectively introduce "virtual" colors that were not present in the destination bit-depth of the channel.

It should be noted that at the analysis stage, the noise values on the noise maps, derived from either the WSAD analysis or band pass filtering, may be computed for all channels, and the statistical analysis may be carried out by cross-correlating these channels. Thus, the results of artifact detection may be different for different color spaces. In a preferred embodiment of the present invention, the Lab color space (where L represents lightness, a and b represent color-opponent dimensions) according to CIE 1976 standard may be used for artifact detection. Therefore, there may be a color space conversion stage for converting other color spaces to the Lab color space before WSAD computation analysis.

Figure 5:
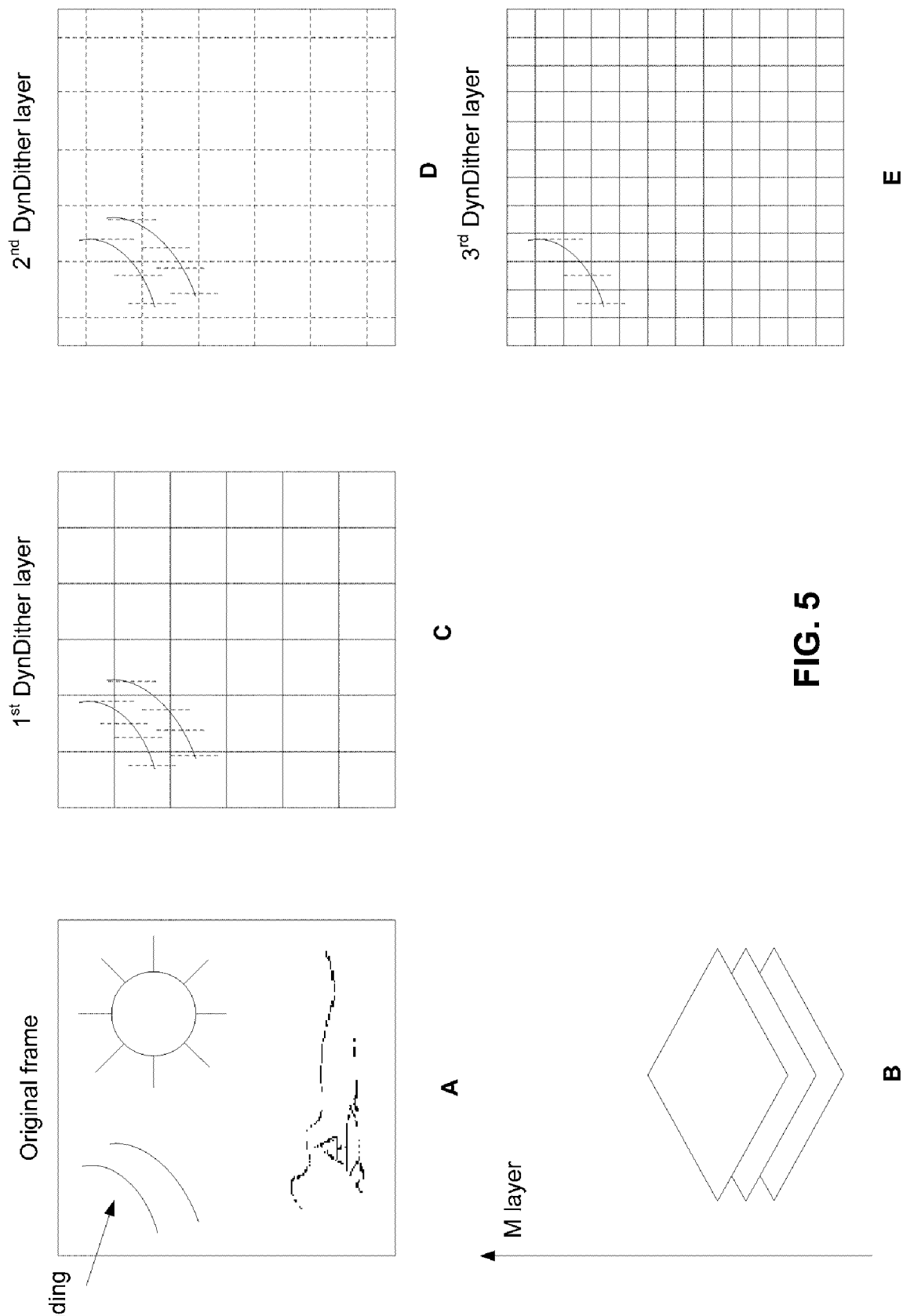
FIG. 5 shows a multi-layered dithering according to one example embodiment of the present invention.

When, for example, 16×16 adjacent pixel blocks are used, there may be blocking artifacts along borders of pixel blocks. To mitigate blocking effects, in one embodiment of the present invention, a multi-layered dithering may be applied to the picture frames. FIG. 5 shows a multi-layered dithering according to one example embodiment of the present invention. FIG. 5A shows a picture frame that may include banding artifacts to which multi layers of dithering (FIG. 5B) may be applied. Differentiating factors between different layers may include pixel block offsets and pixel block size. For example, FIGS. 5C and 5D include dithering layers of pixel blocks that offset each other by half a pixel block size. FIG. 5E include a dithering layer that includes pixel block sizes that are half the size of FIGS. 5C and 5D. The application of multi-layered dithering may reduce the blocking effects at borders of pixel blocks that exist in a single-layered dithering plane.

In another example embodiment of the present invention, the dynamic dithering process may be applied to frames of video at multiple resolutions. Different image resolutions may be achieved via subsampling of the full resolution frame. For computational efficiencies, the contours of banding artifacts and the amount of dithering noise may be computed first at lower resolution. If the results from lower resolutions do not produce results that satisfy pre-determined perceptual criteria, the frames may be further processed at higher resolutions. However, if the results from computation at lower resolution satisfy these perceptual criteria, no further dithering is needed.

In yet another example embodiment of the present invention, the dynamic dithering processes may be applied in 3D forms, e.g., directly to a stack of frames in the video. Three dimensional band pass filtering or three dimensional WSAD analysis may be applied to the stack of frames to determine 3D contours or surfaces of banding artifacts in a stack of video frames. Three dimensional directional shift and subtraction of 3D cubes of pixels (i.e., a stack of 2D blocks of pixels) may be used to determine the amount of dithering noise to be added. Thereby, the dithering pattern and strength may vary not only spatially but also temporally.

In another example embodiment of the present invention, the above-discussed noise computation/analysis, directional shift (A/S/D) may be applied as a preprocessor to a standard video encoder and decoder. Under certain situations, a sequence of input picture frames, e.g., 8 bit non-compressed images, may already include banding or other artifacts before being encoded. As such, a blind dithering may be needed before the encoding process.

Figure 6:
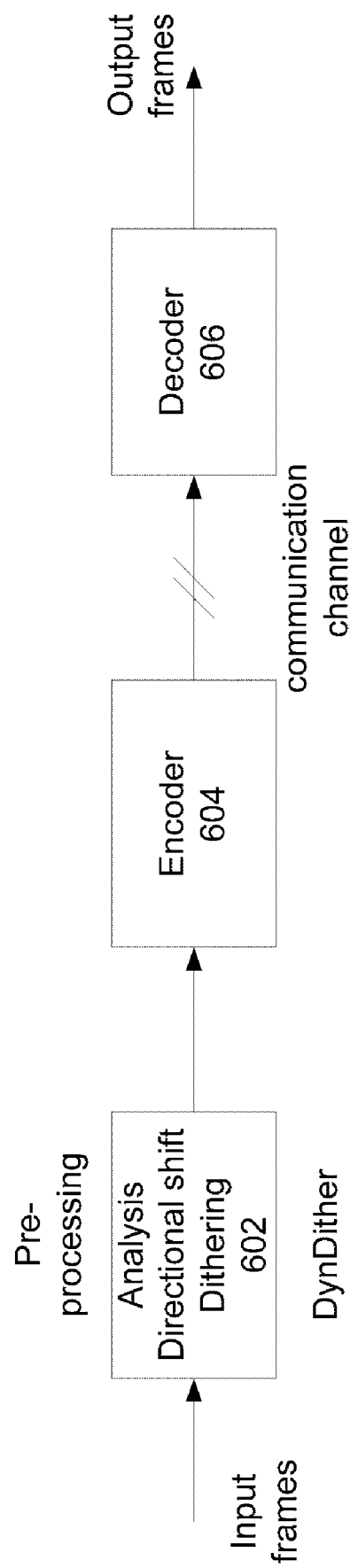
FIG. 6 is a blind dithering pre-processor according to one example embodiment of the present invention.

FIG. 6 is a blind dithering pre-processor according to one example embodiment of the present invention. Input picture frames may be from a poor quality source. At 602, the input picture frames may first undergo a dithering pre-processor to reduce banding/quantization artifacts already existing in the picture frames. A standard video encoder 604 may then encode the dithered picture frames into a video stream for transmitting over communication channels, e.g., wired or wireless communication channels. At the receiving end, a decoder may decode the video stream for display.

Such a setup may advantageously improve the image quality of the poor quality source through the dither pre-processor. Additionally, the coding may be more efficient since fewer bits may be used to encode dithered (i.e., smoothed) picture frames, which commonly is a high frequency signal (high frequency data are expensive to code).

In an alternative embodiment of the present invention, dithering may be applied at both the pre-processing and post-processing stages. Under such an embodiment, the pre-processor may improve the input source quality, and the post-processor may improve the quality of the decoded video.

Often video decoders are provided within devices that have limited computational resources (e.g., portable devices). For such situations, it may be advantageous to allocate certain tasks, e.g., the WSAD computation/analysis and directional shift at the encoding end and dithering at the receiving/decoding terminal. The encoder may include an in-loop decoder to simulate the capacity of a decoder. The information of dynamic dithering may then be transmitted to the receiving end independent from the video bitstream, e.g., via a separate channel or along with the bitstream. The size of the dithering information may be small compared to the video bitstream. Using the small amount of dithering information from the encoder, a custom decoder may carry out the dithering stage and thereby reduce the computational complexity for the decoder at the cost of transmitting a few extra bits.

Figure 7:
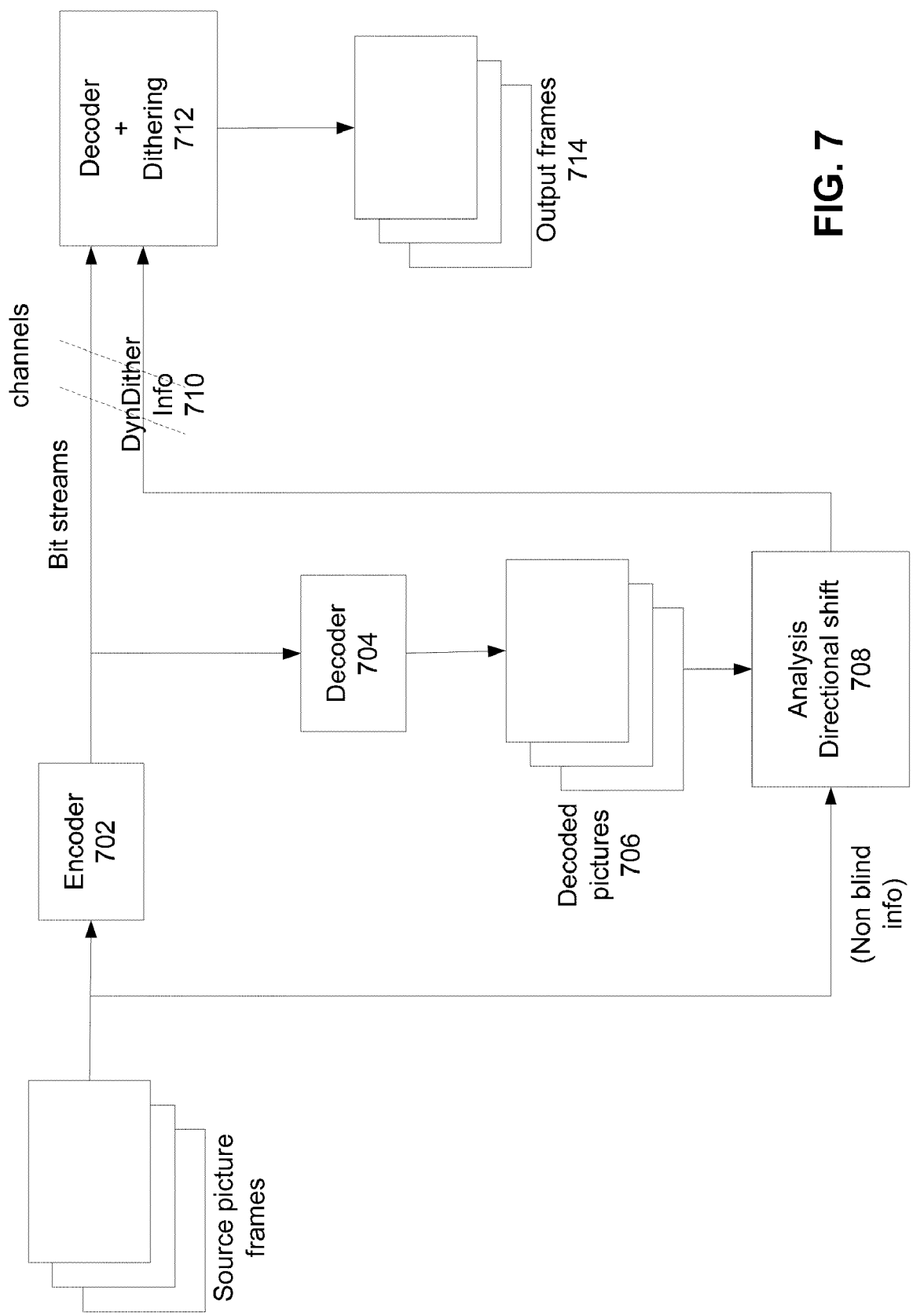
FIG. 7 is a dithering system using a custom encoder for analysis and directional shifting and using a decoder for dithering according to one example embodiment of the present invention.

FIG. 7 is a dithering system using a custom encoder for analysis and directional shifting and using a decoder for dithering according to one example embodiment of the present invention. A conventional video encoder 702 may encode source picture frames first into video bitstreams for transmitting over communication channels or being stored in storage media. The encoded video bitstream may be decoded using a custom decoder 704 embedded in the encoder end that simulates the characteristics of a decoder at the receiving end. Using the decoded pictures 706 and the source picture frames, the custom encoder may compute noise maps 708 for each decoded picture frame 706, analyze the noise maps to determine potential banding/quantization artifacts, and directional shift to generate a dithering zone. The dithering information 710 may be derived based on the location of banding/quantization artifacts and amount of dithering. The information 710 may be in the form of, e.g., a chain code of the boundaries of dithering zones, or other conventional ways for coding a geometric region, and may include both the area and amount of dithering. The custom encoder may then pack the dithering information in pockets for transmitting to the receiving end. In one example embodiment for H.264 compliance codec, the dithering information may be packed in a special supplemental enhanced information (SEI) packet and be transmitted over the communication channel with the video bitstream itself. In another example embodiment, the transmission of the dithering information may be controlled at the custom encoder such that its transmission may be turned on and off on a frame by frame basis. A custom decoder 712 may receive the video bitstreams and dithering inform for decoding and dithering to generate output frames 714.

Referring to FIG. 7, it may be noted that having both the source picture frames and the decoded frames in the encoder end may allow the custom encoder to perform a more accurate and more efficient analysis of the noise maps for the area and amount of dithering. It may also be noted that the system illustrated in FIG. 7 is independent of particular video standard. It may be used in MPEG-2, MPEG-4, H.264, or other conventionally known video codecs.

In another example embodiment of the present invention, the dynamic dithering may be applied to transcoding, where the source picture frames are from a decoder rather than directly from an originally uncompressed video source. The decoded video may be encoded again for further transmission. Under this scenario, the quality of the input video may be severely degraded during the first encoding stage. The input picture frames may already include banding/quantization artifacts from the encoding/decoding at the first stage. Transcoding is commonly used for mobile applications or video format conversions from (e.g., MPEG-2 to H.264). Under this situation, there may be no information directly from the original video source. The objective is to reduce artifacts.

Figure 8:
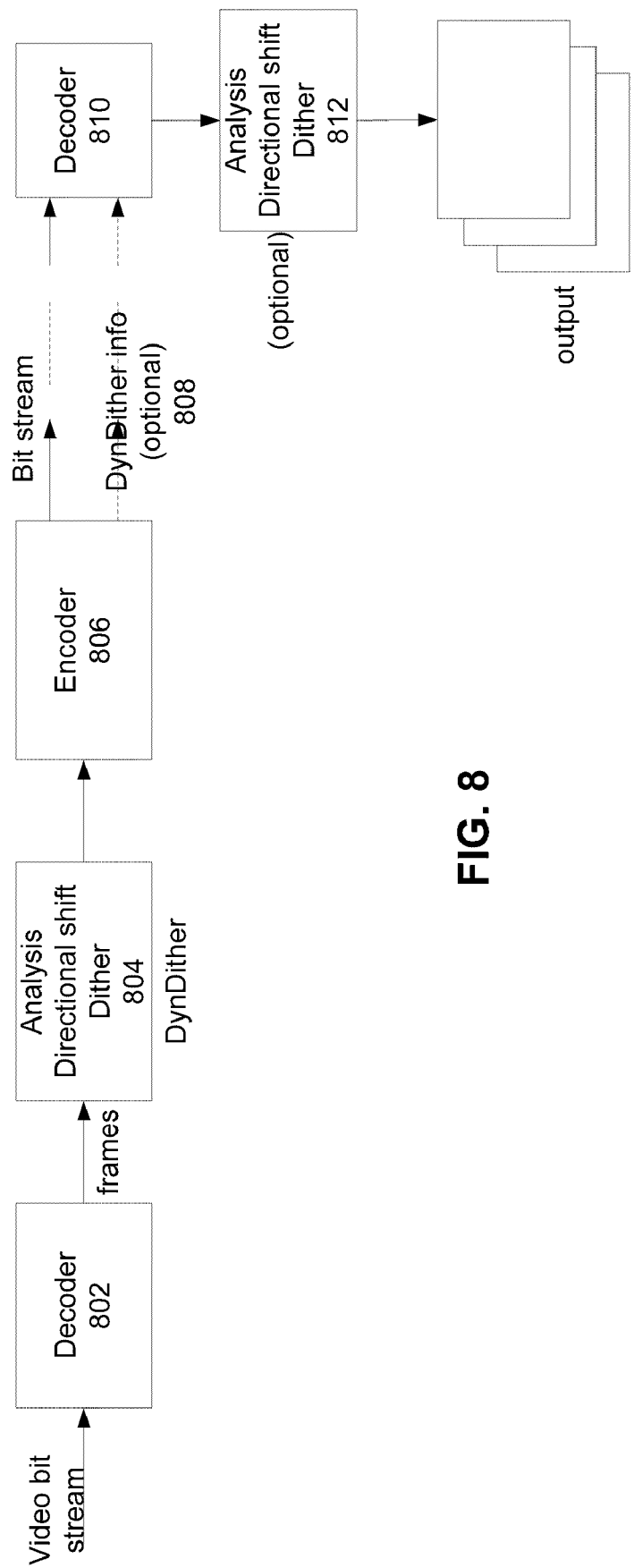
FIG. 8 is a dithering system for transcoding according to one example embodiment of the present invention.

The dynamic dithering process may be in the pre-processing stage, the post-processing stage, or in a mixture of both. FIG. 8 is a dithering system in transcoding according to one example embodiment of the present invention. A video bitstream, e.g., MPEG-2 HD, encoded by a prior encoder, e.g., a MPEG-2 encoder, may be decoded at the first decoder 802, e.g., a MPEG-2 decoder, to generate decoded picture frames. In one example embodiment, the noise analysis, directional shift, and dithering steps of dynamic dithering may be carried out in the preprocessing stage 804. After dithering reduces banding/quantization artifacts in picture frames, the picture frames may be encoded by an encoder, e.g., a H.264 encoder, to generate a second bitstream for transmission over a communication channel or storage. At the receiving end, a second decoder 810, e.g., a H.264 decoder, may decode the H.264 bitstream again into picture frames for display.

In an alternative embodiment of the present invention, the decoder may include further dynamic dithering 812 that includes noise analysis, directional shift, and dithering. The second dynamic dithering may correct banding/quantization artifacts caused by the encoder 806 and decoder 810. In yet another alternative embodiment of the present invention, after the first dynamic dithering, dithering information may be transmitted along with bitstreams over the communication channel to the send decoder. This may be useful for situation where the second decoder has limited computational resources.

Under certain scenarios, the encoder may be simply a standard encoder, but at the receiving end, the decoder may be a custom decoder in the sense that the decoder may output extra information, e.g., quantization values from the bitstream, bit rates, decoder buffer occupancy, or discrete cosine transform (DCT) frequency values etc. The types of the extra information available from a custom decoder may depend on the video standard. The extra information may be used in the subsequent dynamic dithering post-processor for improved results.

Figure 9:
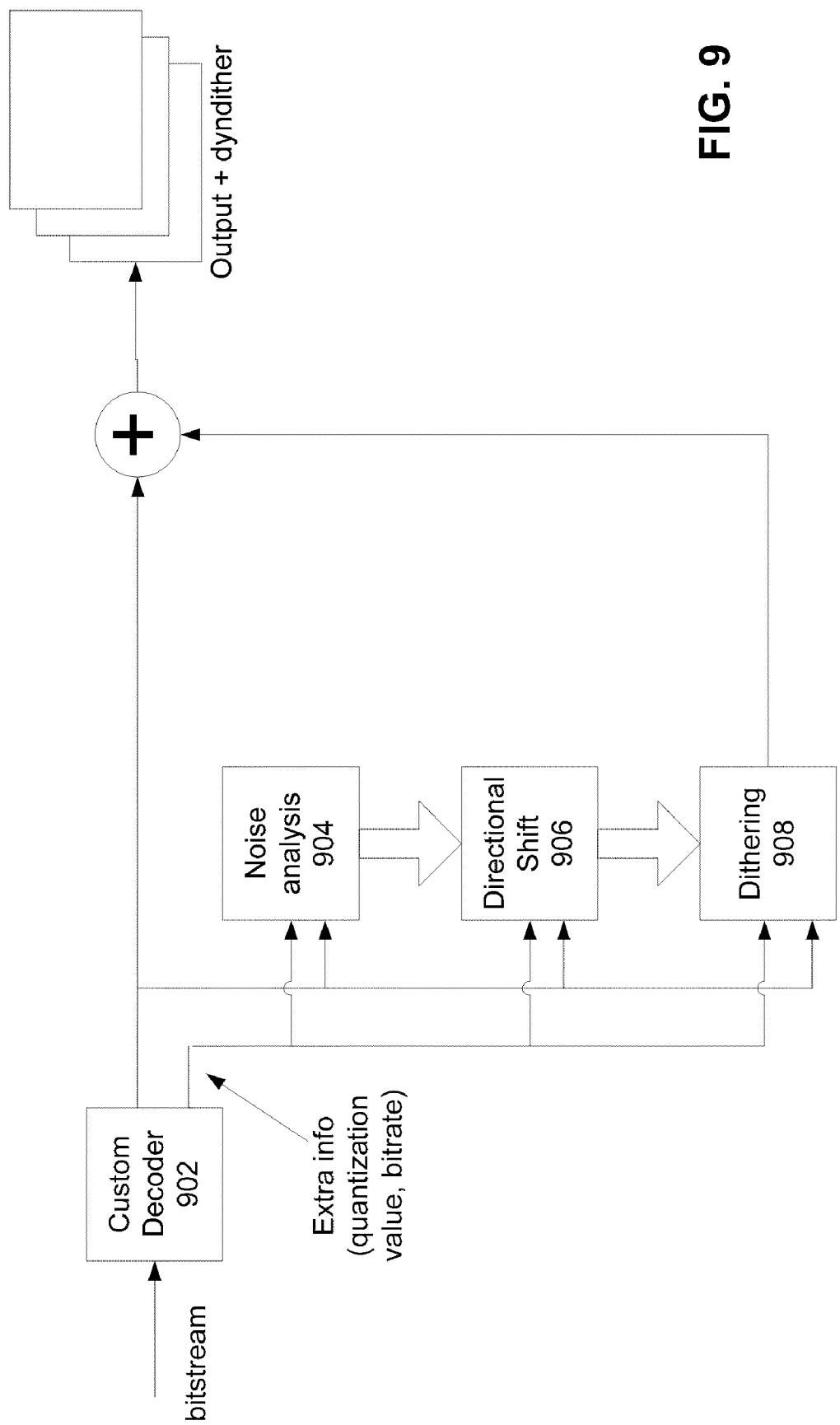
FIG. 9 is a dithering system using a custom decoder according to one example embodiment of the present invention.

FIG. 9 is a dithering system using a custom decoder according to one example embodiment of the present invention. After decoding a bitstream, a custom decoder 902 may output picture frames and extra information, e.g., quantization values and bitrates, to each of the noise analysis, directional shift, and dithering. Rather than a blind dynamic dithering process, the extra information may help improve the dynamic dithering process.

In one example embodiment of the present invention, the dynamic dithering may be implemented with only the directional shift and dithering stages, but without the noise analysis stage. In one example embodiment, the directional shift may include a subtraction of the shifted video frame from the original frame. In an alternative example embodiment, the directional shift may include only shift without the subtraction from the original frame. Regions of "banding" artifacts may be detected from the directionally shifted video frames via analysis. For example, the "banding" artifacts may be detected based on a statistical analysis of the directional shift differences.

Figure 10:
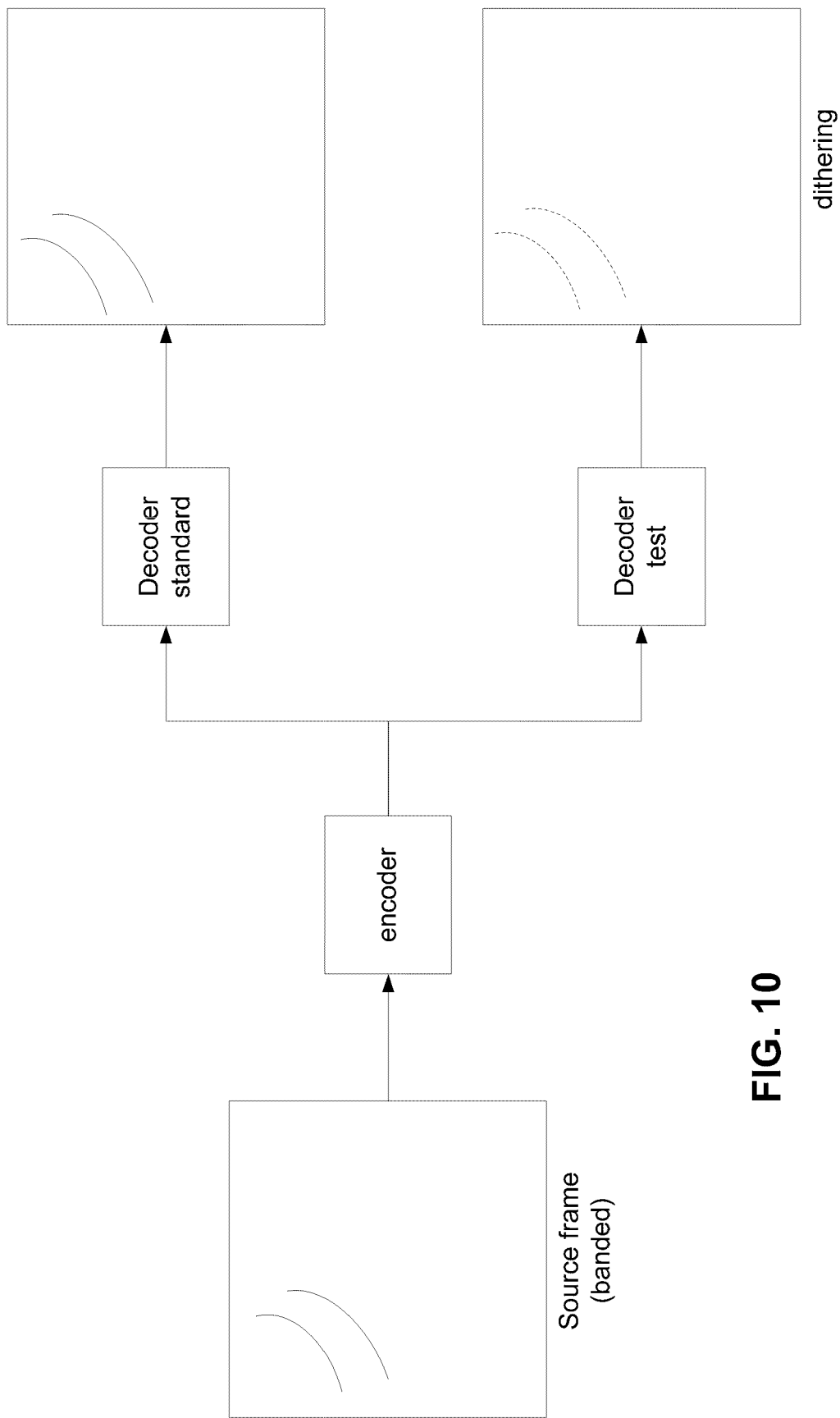
FIG. 10 is a comparison of standard decoder and test decoder with dynamic dithering according to one example embodiment of the present invention.
Figure 11:
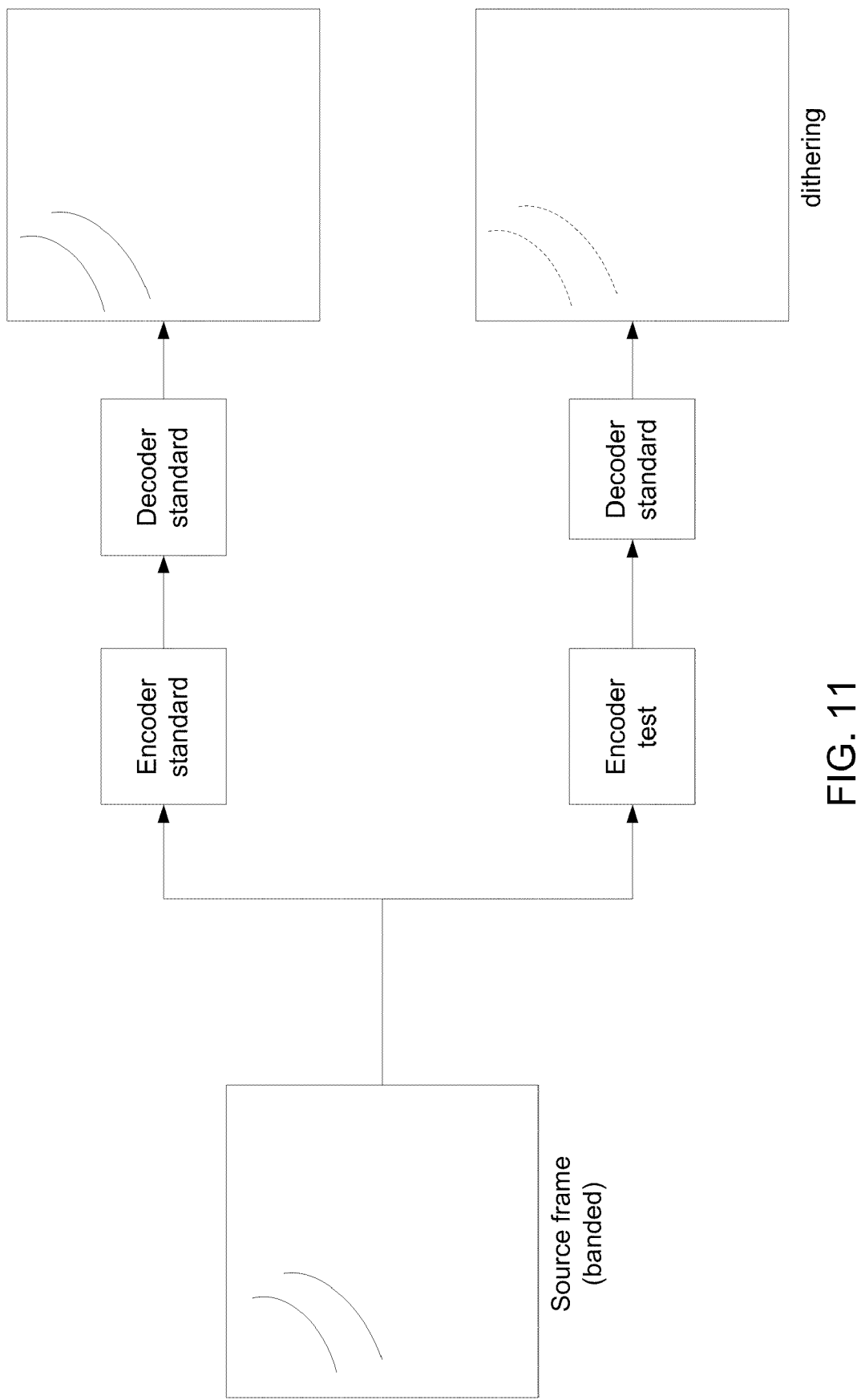
FIG. 11 is a comparison of standard encoder and test encoder with dynamic dithering according to one example embodiment of the present invention.

The results with and without dynamics dithering may be compared using a custom test bitstream that contains known band/quantization artifacts encoded with a standard encoder. FIG. 10 is a comparison of standard decoder and test decoder with dynamic dithering according to one example embodiment of the present invention. By comparing along the known banding areas for dithering patterns, whether a decoder comprising dynamic dithering may be detected. Similarly, FIG. 11 is a comparison of standard encoder and test encoder with dynamic dithering according to one example embodiment of the present invention. By comparing along the known banding areas for dithering patterns, whether an encoder comprising dynamic dithering may be detected. The comparison of results between a standard decoder and a test decoder or between a standard encoder and a test decoder may be used to tune parameters, e.g., the amount of dithering, of the dynamic dithering.

Figure 12:
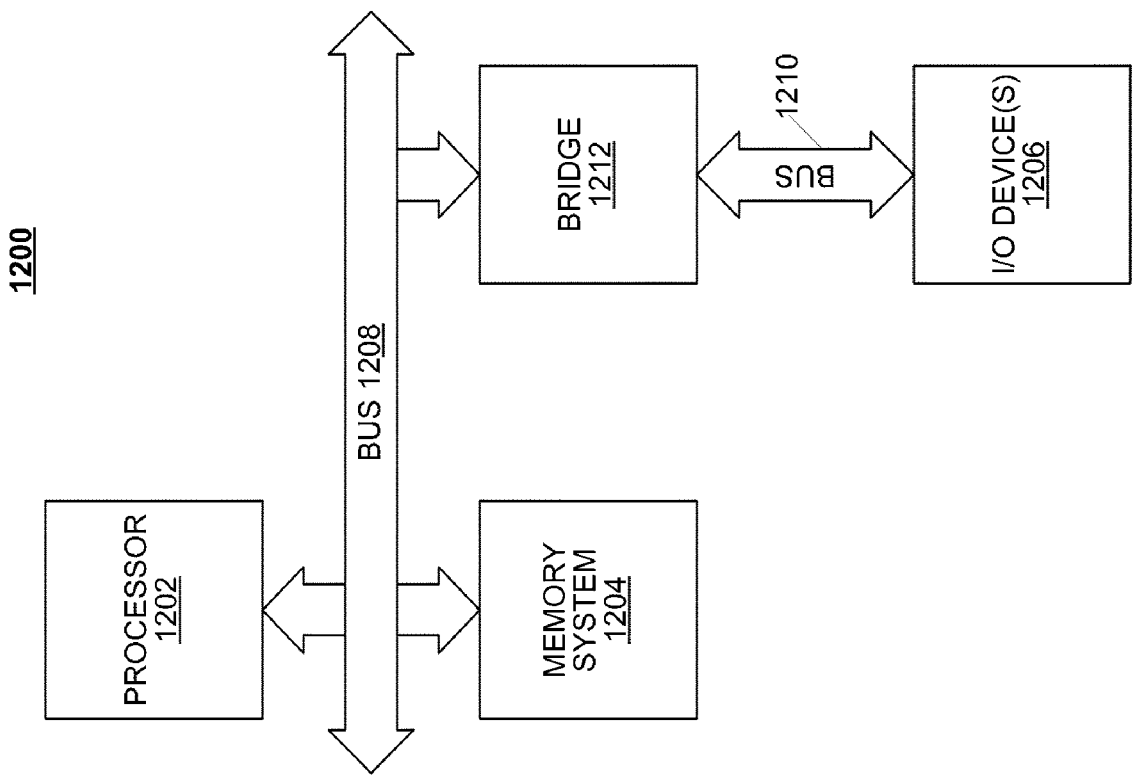
FIG. 12 is an example embodiment of a particular hardware implementation of the present invention.

FIG. 12 is a simplified functional block diagram of a computer system 1200. A coder and decoder of the present invention can be implemented in hardware, software or some combination thereof. The coder and or decoder may be encoded on a computer readable medium, which may be read by the computer system of 1200. For example, an encoder and/or decoder of the present invention can be implemented using a computer system.

As shown in FIG. 12, the computer system 1200 includes a processor 1202, a memory system 1204 and one or more input/output (I/O) devices 1206 in communication by a communication 'fabric.' The communication fabric can be implemented in a variety of ways and may include one or more computer buses 1208, 1210 and/or bridge devices 1212 as shown in FIG. 12. The I/O devices 1206 can include network adapters and/or mass storage devices from which the computer system 1200 can receive compressed video data for decoding by the processor 1202 when the computer system 1200 operates as a decoder. Alternatively, the computer system 1200 can receive source video data for encoding by the processor 1202 when the computer system 1200 operates as a coder.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for dithering video, comprising:
   selecting a segment of video frames from the video;
   computing a noise map for the segment of the video, the noise map computed from differences among pixels selected from spatially-distributed sampling patterns in the segment;
   determining contours of quantization artifacts within the segment based on the noise map and a histogram of pixel values in the segment;

computing a gradient measurement of pixel values along the contours;

identifying regions along the contours of quantization artifacts to apply dithering based on the noise map and the gradient measurement;

determining a dithering strength based on the noise map and the gradient measurement; and applying dithering noise to the identified regions at the determined dithering strength.

2. The method of claim 1, wherein the segment of video frames includes only one video frame.

3. The method of claim 1, wherein the segment of video includes more than one video frame.

4. The method of claim 1, wherein the noise map includes an array of elements each representing a pixel location.

5. The method of claim 1, wherein the noise map includes an array of elements each representing a location of a block of pixels.

6. The method of claim 1, wherein the computing of the noise map is based on band-pass filtering the segment.

7. The method of claim 6, wherein the band-pass filtering is a difference of gaussians filtering.

8. The method of claim 1, wherein the computing of the noise map is based on a plurality of WSAD values each representing a weighted sum of absolute differences among pixels of a block of pixels, each WSAD value determined from a different sampling pattern taken across the block of pixels.

9. The method of claim 8, wherein the noise map is further determined based on a confidence interval as a function of the plurality of WSAD values.

10. The method of claim 8, wherein the different sampling pattern includes pairs of pixels.

11. The method of claim 8, wherein the different sampling pattern is generated randomly.

12. The method of claim 1, wherein the contours are represented by pixel locations.

13. The method of claim 1, wherein the contours are represented by locations of pixel blocks.

14. The method of claim 1, wherein the quantization artifacts include banding artifacts.

15. The method of claim 14, wherein the banding artifacts are caused by video quantization.

16. The method of claim 15, wherein the determining of the contours of banding artifacts is based on a detection of peaks in a statistical measurement of the noise map.

17. The method of claim 1, wherein the computing of the gradient measurement is based on shift differences among adjacent blocks of pixels in up, down, left, or right direction.

18. The method of claim 17, wherein the shift differences are directional to at least one of the up, down, left, and right directions.

19. The method of claim 17, wherein the shift differences are isotropic to directions.

20. The method of claim 17, wherein the gradient measurement is a sum of shift differences in the up, down, left, and right directions.

21. A method for dithering video and transmiting dithering information from a custom encoder over a communication channel, comprising:

(a) selecting a segment of video frames from the video;

(b) computing a noise map for the segment of the video, the noise map computed from differences among pixels selected from spatially-distributed sampling patterns in the segment;

(c) determining contours of quantization artifacts within the segment based on the noise map and a histogram of pixel values in the segment;

(d) computing a gradient measurement of pixel values along the contours;

(e) identifying regions along the contours of quantization artifacts to apply dithering based on the noise map and the gradient measurement;

(f) determining a dithering strength based on the noise map and the gradient measurement;

(g) transmitting the video and dithering information over the communication channel to a decoder, the dithering information including the contours of quantization artifacts, the identified regions along the contours, and the determined dithering strength.

22. The method of claim 21, further comprising:

decoding the bitstream into the video at the decoder; and dithering the video based on the dithering information.

23. The method of claim 21, wherein the performance of steps (a)-(g) occurs only when the decoder has limited resources.

24. The method of claim 21, wherein the encoder decodes the bitstream using an in-loop decoder built in the encoder.

25. The method of claim 21, wherein the communication channel is wired.

26. The method of claim 21, wherein the communication channel is wireless.

27. The method of claim 21, wherein the quantization artifacts include banding artifacts.

28. A method for dithering video to be encoded in an encoder, comprising:

selecting a segment of video frames from the video;

computing a noise map for the segment of the video, the noise map computed from differences among pixels selected from spatially-distributed sampling patterns in the segment;

determining contours of quantization artifacts within the segment based on the noise map and a histogram of pixel values in the segment;

computing a gradient measurement of pixel values along the contours;

identifying regions along the contours of quantization artifacts to apply dithering based on the noise map and the gradient measurement;

determining a dithering strength based on the noise map and the gradient measurement;

applying dithering noise to the identified regions at the determined dithering strength, encoding the dithered video at the encoder.

29. A device for dithering a video, comprising:

a processor configured to perform:

selecting a segment of video frames from the video;

computing a noise map for the segment of the video, the noise map computed from differences among pixels selected from spatially-distributed sampling patterns in the segment;

determining contours of quantization artifacts within the segment based on the noise map and a histogram of pixel values in the segment;

computing a gradient measurement of pixel values along the contours;

identifying regions along the contours of quantization artifacts to apply dithering based on the noise map and the gradient measurement;

determining a dithering strength based on the noise map and the gradient measurement; and applying dithering noise to the identified regions at the determined dithering strength.

30. A non-transitory machine-readable medium stored thereon codes configured to perform a method for dithering video from a decoder, comprising:
selecting a segment of video frames from the video;
computing a noise map for the segment of the video, the noise map computed from differences among pixels selected from spatially-distributed sampling patterns in the segment;
determining contours of quantization artifacts within the segment based on the noise map and a histogram of pixel values in the segment;
computing a gradient measurement of pixel values along the contours;
identifying regions along the contours of quantization artifacts to apply dithering based on the noise map and the gradient measurement;
determining a dithering strength based on the noise map and the gradient measurement; and
applying dithering noise to the identified regions at the determined dithering strength.

31. A method for dithering video from a decoder, comprising:
computing directional shift differences for a video frame;
determining contours of quantization artifacts in the video frame based on the directional shift differences and a histogram of pixel values in the video frame;
computing a gradient measurement of pixel values along the contours;
identifying regions along the contours of quantization artifacts to apply dithering based on the gradient measurement;
determining a dithering strength based on the gradient measurement; and
applying dithering noise to the identified regions at the determined dithering strength.

32. The method of claim 31, wherein the directional shift differences are computed in at least one of the up, down, left, and right directions.

33. A method comprising:
selecting a segment of video frames from a video;
computing a noise map for the segment of the video, the noise map computed from differences among pixels selected from spatially-distributed sampling patterns in the segment;
determining contours of quantization artifacts within the segment based on the noise map and a histogram of pixel values in the segment;
computing a gradient measurement of pixel values along the contours;
identifying regions along the contours of quantization artifacts to apply dithering based on the noise map and the gradient measurement; and
determining a dithering strength based on the noise map and the gradient measurement.

* * * * *